United States Patent
Klassen et al.

(10) Patent No.: US 12,540,684 B2
(45) Date of Patent: Feb. 3, 2026

(54) METHOD FOR OPERATING A FLUID SYSTEM AND FLUID SYSTEM

(71) Applicant: FESTO SE & CO. KG, Esslingen (DE)

(72) Inventors: Daniel Klassen, Esslingen (DE); Jan Gröber, Denkendorf (DE); Valentin Falkenhahn, Stuttgart (DE)

(73) Assignee: FESTO SE & CO. KG, Esslingen (DE)

(*) Notice: Subject to any disclaimer, the term of this patent is extended or adjusted under 35 U.S.C. 154(b) by 0 days.

(21) Appl. No.: 18/708,114

(22) PCT Filed: Nov. 9, 2022

(86) PCT No.: PCT/EP2022/081315
§ 371 (c)(1),
(2) Date: May 7, 2024

(87) PCT Pub. No.: WO2023/083881
PCT Pub. Date: May 19, 2023

(65) Prior Publication Data
US 2025/0155044 A1 May 15, 2025

(30) Foreign Application Priority Data
Nov. 12, 2021 (DE) .................... 10 2021 212 780.0

(51) Int. Cl.
*F16K 31/00* (2006.01)
*F16K 39/02* (2006.01)

(52) U.S. Cl.
CPC .......... *F16K 31/005* (2013.01); *F16K 39/024* (2013.01)

(58) Field of Classification Search
CPC .... F16K 31/005; F16K 39/024; F16K 31/004; F16K 99/0048
See application file for complete search history.

(56) References Cited

U.S. PATENT DOCUMENTS 8,631,825 B2 * 1/2014 Lee .................. F16K 31/006
137/884
9,528,617 B2 * 12/2016 Maichl .................. F16K 27/003
(Continued)

FOREIGN PATENT DOCUMENTS

CN 111188942 B 6/2021
DE 11 2004 000 574 T5 2/2006
(Continued)

OTHER PUBLICATIONS

DE 102019200524 A1, Beuel, Machine Translation (Year: 2019).*
(Continued)

*Primary Examiner* — Daphne M Barry
(74) *Attorney, Agent, or Firm* — HSML P.C.

(57) ABSTRACT

A method for operating a fluid system, which has a control device with a control functionality and a piezoelectric valve assembly that can be controlled by the control device. The method involves the following steps: providing a target working pressure at the working connection, measurement of the actual working pressure at the working connection by the pressure sensor, transmitting the measurement data to the control device and applying the algorithm to compare the actual working pressure with the target working pressure, activating the at least one integrator to integrate the control deviation of the control voltage (=offset voltage) after the actual working pressure is constant over a certain time period, and changing the control voltage as a function of the determined target/actual deviation taking into account the integrator operation.

13 Claims, 3 Drawing Sheets

(56) References Cited

U.S. PATENT DOCUMENTS

| | | | |
|---|---|---|---|
| 2004/0200349 A1 | 10/2004 | Moler et al. | |
| 2006/0265105 A1* | 11/2006 | Hughes | H02M 3/00 700/282 |
| 2015/0378370 A1* | 12/2015 | Maichl | F15B 13/0867 137/487.5 |
| 2017/0234333 A1* | 8/2017 | Wirtl | F15B 11/04 91/459 |
| 2019/0049032 A1 | 2/2019 | Maichl et al. | |

FOREIGN PATENT DOCUMENTS

| | | |
|---|---|---|
| DE | 10 2010 035 263 B4 | 11/2013 |
| DE | 10 2019 200 524 A1 | 7/2020 |
| WO | 2016/023569 A1 | 2/2016 |
| WO | 2017/045701 A1 | 3/2017 |

OTHER PUBLICATIONS

Examination Report issued in corresponding German Patent Application No. 10 2021 212 780.0, dated Oct. 18, 2022, 4 pages.
International Search Report issued in International Application No. PCT/EP2022/081315 dated Jan. 30, 2023, 5 pages w/translation.

* cited by examiner

METHOD FOR OPERATING A FLUID SYSTEM AND FLUID SYSTEM

The invention relates to a method for operating a fluid system and a fluid system. The fluid system has a control device with a control function and a piezoelectric valve assembly that can be controlled by the control device, wherein the piezoelectric valve assembly has an aeration port connected to a pressure source and a vent port connected to a pressure sink, wherein the piezoelectric valve assembly has at least one aeration valve formed as a piezoelectric valve and connected to the aeration port and at least one vent valve formed as a piezoelectric valve and connected to the vent port, wherein the aeration and vent valve are respectively connected to at least one working connection connected to a working chamber of the fluid consumer, and wherein the aeration and vent valve respectively have at least one piezoelectric bending transducer, which in a closed position bears against a valve seat of the associated valve and closes a through-opening in a fluid-tight manner and which can be moved into open positions lifted to different extents from the valve seat as a function of an applied control voltage.

Such fluid systems have been known for some time.

The use of piezoelectric valves in fluid systems has the advantage that piezoelectric valves have a low power consumption and exhibit proportional behaviour depending on the voltage applied such that piezoelectric valves can be readily used as proportional valves. Furthermore, such piezoelectric valves have a long service life, short switching times and cause substantially no switching noise.

Furthermore, piezoelectric valves often have a soft sealing seat, wherein the soft sealing seat is characterized in that sealing can be easily guaranteed without imposing great design and manufacturing requirements and wherein sealing can be guaranteed over the entire operating range (e.g. even in the case of temperature changes).

However, these aforementioned advantages of the piezoelectric valve or soft sealing seat are also associated with technical control challenges. For example, a piezoelectric valve, in particular the associated piezoelectric bending transducer, is subject to ageing, which significantly changes the properties of the piezoelectric bending transducer. Furthermore, such piezoelectric valves react sensitively to temperature changes and changing differential pressures on the bender or bending transducer. The soft sealing seat is also subject to the aforementioned effects.

This results in the issue that, inter alia, the offset voltage can drift; in particular, the opening point of the piezoelectric valve is dependent on the aforementioned effects.

Due to the physical properties of the piezoelectric valve, the opening point shifts considerably over the course of a life cycle, even after being stored with short operating times, such that this has an impact on the performance of the application and must therefore not be neglected.

SUMMARY OF THE INVENTION

The object of the invention is therefore to propose a method for operating a fluid system and a fluid system that prevents the aforementioned negative effects from impacting the performance of the associated application.

This object is achieved by means of a method for operating a fluid system having the features of independent claim 1 and by means of a fluid system having the features of independent claim 8. Embodiments of the invention are set out in the dependent claims.

In the method according to the invention for operating a fluid system, which has a control device with a control functionality and a piezoelectric valve assembly that can be controlled by the control device, wherein the piezoelectric valve assembly has an aeration port connected to a pressure source and a vent port connected to a pressure sink, wherein the aeration port and the working connection are respectively connected to a pressure sensor coupled to the control device, and wherein the control device has a control algorithm with at least one implemented integrator, the method involves the following steps:

providing a target working pressure at the working connection, measurement of the actual working pressure at the working connection by the pressure sensor, transmitting the measurement data to the control device and applying the algorithm to compare the actual working pressure with the target working pressure, activating the at least one integrator to integrate the control deviation of the control voltage after the actual working pressure is constant over a certain time period, changing the control voltage as a function of the determined target/actual deviation taking into account the integrator operation.

It is thus possible to identify and compensate for the offset voltage of the aeration and vent valve during operation. In particular, the offset voltage required for the opening point of the aeration and vent valve can thus be determined during operation. It is therefore possible for the application to continue running as required while the offset voltage shift is being identified. It is therefore not necessary to stop the application.

Another advantage is that only pressure sensors are required for the method. It is not necessary to measure the actual mass flow. Furthermore, position sensors are not required either. This results in a relatively simple and cost-effective design of the fluid system and operation of the method.

Another important aspect is that the implemented integrators are only active under defined conditions. This means that the integrators can be switched on and off or can be activated and deactivated. One such defined condition is the presence of a constant actual working pressure over a certain time period. When the target working pressure is changed to another value due to the application, the integrators are therefore deactivated. With the algorithm, it is possible for the manipulated variable to be integrated and added to the output of the control device with the control functionality, which could also be referred to as a controller, until the output of the control device is zero. The remaining control deviation is thus eliminated by the integrators such that the control error becomes equal to zero. If the output of the control device is zero, the entire offset voltage is represented by the integrators.

In one embodiment of the invention, at least two integrators that can be activated independently of on another are implemented in the control algorithm, of which at least one is active during aeration through the aeration valve and at least another is active during venting through the vent valve.

In one embodiment of the invention, as already mentioned, at least one integrator of the control algorithm is deactivated when the target working pressure is changed or the measured actual working pressure changes over a certain time period.

It is possible for the application to require the pressure to remain constant in a working chamber over a certain time period. Although it is then possible to "lock in" the pressure in the working chamber by closing the aeration valve and closing the vent valve, the pressure could drop due to disturbance variables. In order to address this issue, both the aeration valve and the vent valve then become active such that the pressure is then regulated back to the required constant target working pressure. However, if the aeration valve and vent valve are operated in this way, fluid may overflow from the pressure source via the aeration valve and from there to the pressure sink, which would lead to an internal air loss, which is to be prevented.

In order to address this issue, it is provided in one embodiment of the invention that the at least one integrator of the vent valve is driven slowly towards a lower limit value during operation, wherein the speed is lower than the integration of the control deviation of the control voltage.

Another approach is that the at least one integrator of the aeration valve or the at least one integrator of the vent valve is activated and the offset voltage of the bending transducer of the aeration valve or the offset voltage of the bending transducer of the vent valve is integrated whilst the respective other bending transducer is set to a defined state. By way of example, a defined state is the closed position of the bending transducer of the vent valve.

In one embodiment of the invention, the fluid consumer has two working chambers that can be aerated or vented separately, in particular independently of one another, of which a first working chamber is associated with a first aeration valve and a first vent valve with a first working connection and first pressure sensor and a second working chamber is associated with a second aeration valve and a second vent valve with a second working connection and second pressure sensor.

The fluid consumer is particularly preferably a single or double-acting working cylinder. In this case, the working chambers are working chambers that can be pressurized with fluid. However, other fluid consumers are also conceivable, for example single or double-acting diaphragm actuators, fluidic, in particular pneumatic grippers or a pressure-controlled volumetric unit.

It is possible for the control device to have at least one pressure regulator, for example two independent pressure regulators.

The invention further relates to a fluid system for operating a fluid consumer, wherein the fluid consumer has a control device with a control functionality and a piezoelectric valve assembly that can be controlled by the control device, wherein the piezoelectric valve assembly has an aeration port connected to a pressure source and a vent port connected to a pressure sink, wherein the piezoelectric valve assembly has at least one aeration valve formed as a piezoelectric valve and connected to the aeration port and at least one vent valve formed as a piezoelectric valve and connected to the vent port, wherein the aeration and vent valve are respectively connected to at least one working connection connected to a working chamber of the fluid consumer, and wherein the aeration and vent valve respectively have at least one piezoelectric bending transducer, which in a closed position bears against a valve seat of the associated valve and closes a through-opening in a fluid-tight manner and which can be moved into open positions lifted to different extents from the valve seat as a function of an applied control voltage, wherein the aeration port and the working connection are respectively connected to a pressure sensor coupled to the control device, and wherein the control device has a control algorithm with at least one implemented integrator, and wherein the control device is designed to carry out a comparison of the actual working pressure with the target working pressure from a provided target control voltage which corresponds to a desired target working pressure at the working connection and from a measurement of the actual working pressure at the working connection by the pressure sensor, wherein the at least one integrator can be activated to integrate the control deviation of the control voltage after the actual working pressure is constant over a certain time period and wherein the control voltage can be changed as a function of the determined target/actual deviation taking into account the integrator operation.

In one embodiment of the invention, the control device is designed to carry out the method according to one of claims 1 to 7.

In one embodiment of the invention, the piezoelectric valves respectively have two piezoelectric bending transducers or bending transducers that can be controlled independently of one another.

In one embodiment of the invention, the fluid system comprises four piezoelectric valves, which are interconnected in the form of a bridge circuit. Such an assembly is in particular suitable for controlling and regulating the pressures of fluid consumers with two working chambers, wherein with this design, both working connections and thus both working chambers can be aerated and vented independently of one another. In this case, the one working chamber is therefore associated with an aeration and a vent valve and the other working chamber is also associated with an aeration and a vent valve.

In one embodiment of the invention, the pressure sensor associated with the aeration port is designed to determine the aeration or supply pressure as an absolute pressure sensor.

In one embodiment of the invention, a pressure sensor for determining the vent or exhaust air pressure is associated with the vent port. This can also be an absolute pressure sensor.

The invention further comprises a computer program product for use in a computer device comprising instructions, which carry out the method according to one of claims 1 to 7, when executed in a control device of a fluid system.

BRIEF DESCRIPTION OF THE DRAWINGS

A preferred exemplary embodiment of the invention is shown in the drawing and explained in more detail below. In the drawing.

DETAILED DESCRIPTION OF THE INVENTION

Figure 1:
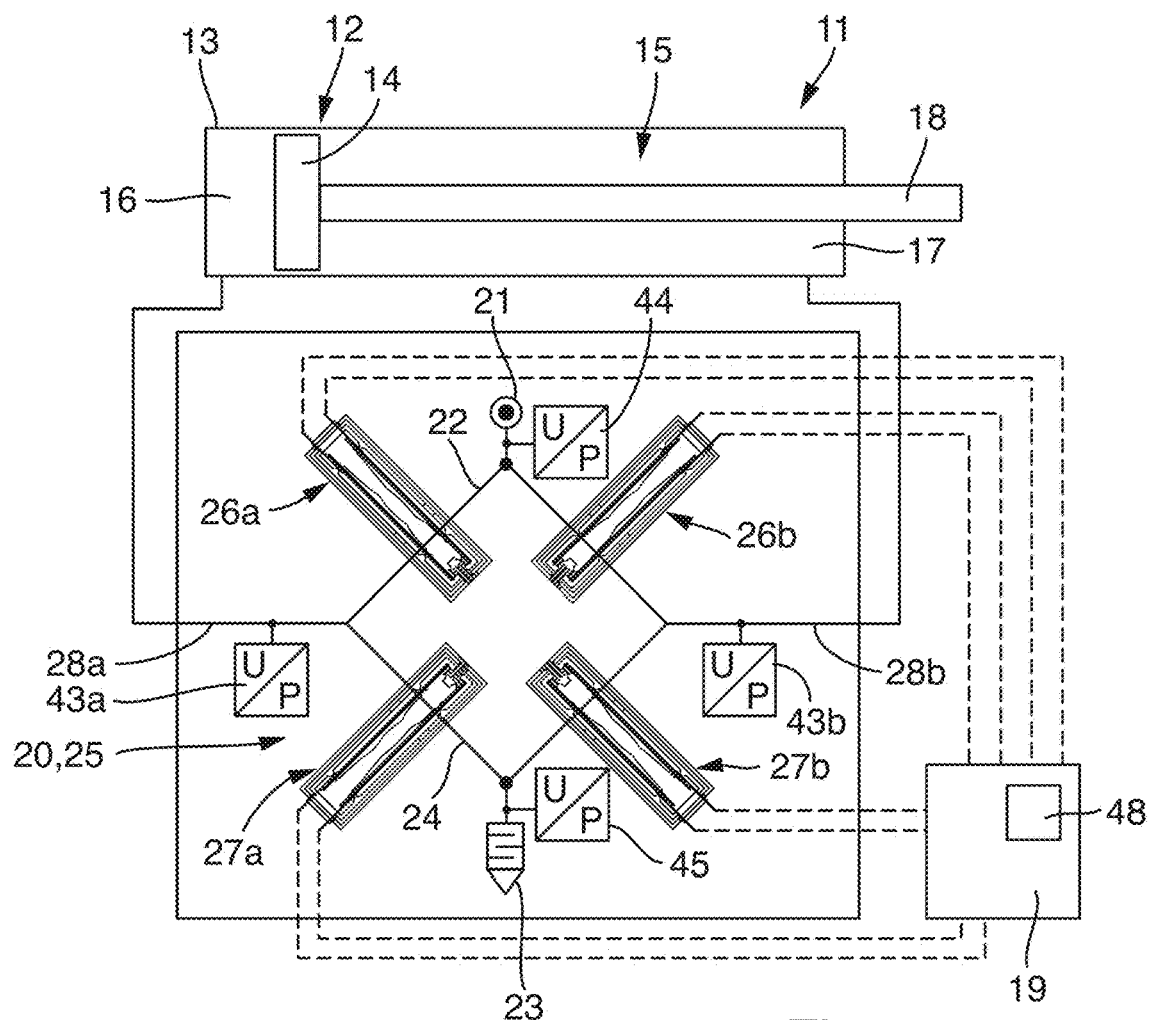
FIG. 1 shows a schematic illustration of a preferred exemplary embodiment of the fluid system according to the invention, with which the method according to the invention can be carried out.

FIG. 1 shows a preferred exemplary embodiment of the fluid system 11 according to the invention. The fluid system 11 shown is purely exemplary and in the example shown has a fluid consumer 12 in the form of a double-acting working cylinder. The double-acting working cylinder shown purely schematically has a cylinder housing 13, in which a piston 14 is mounted for linear movement by means of fluid pressurization. The piston 14 divides an interior 15 of the cylinder housing 13 into a first working chamber 16 and a second working chamber 17. The piston 14 is connected to a piston rod 18, which is guided out of the cylinder housing 13 and can be connected to an output member (not shown) at its free end.

The fluid system 11 further comprises a control device 19 with a control functionality and a piezoelectric valve assembly 20 that can be controlled by the control device 19.

As shown further in FIG. 1, the piezoelectric valve assembly has an aeration port 22 connected to a pressure source 21 and a vent port 24 connected to a pressure sink 23.

In the example shown, the piezoelectric valve assembly 20 comprises a piezoelectric bridge circuit 25 with a plurality of piezoelectric valves. At least two aeration valves 26a, 26b formed as piezoelectric valves and connected to the aeration port 22 are provided in the example shown of the bridge circuit 25, and at least two vent valves 27a, 27b formed as piezoelectric valves and connected to the vent port 24 are provided in the example shown of the bridge circuit 25. The aeration and vent valves 26a, 26b; 27a, 27b are respectively connected to at least one working connection 28a, 28b connected to a working chamber 16, 17 of the fluid consumer 12.

In the example shown, a first valve pair made up of a first aeration valve 26a and a first vent vale 27a is connected to a first working connection 28a, which is connected to the first working chamber 16. Accordingly, a second valve pair made up of a second aeration valve 26b and a second vent valve 27b is connected to the second working chamber 17 of the double-acting working cylinder via a second working connection 28b.

With this valve arrangement, it is possible to aerate or vent both working chambers 16, 17 at the same time or to aerate one of the working chambers and vent the other.

Figure 3:
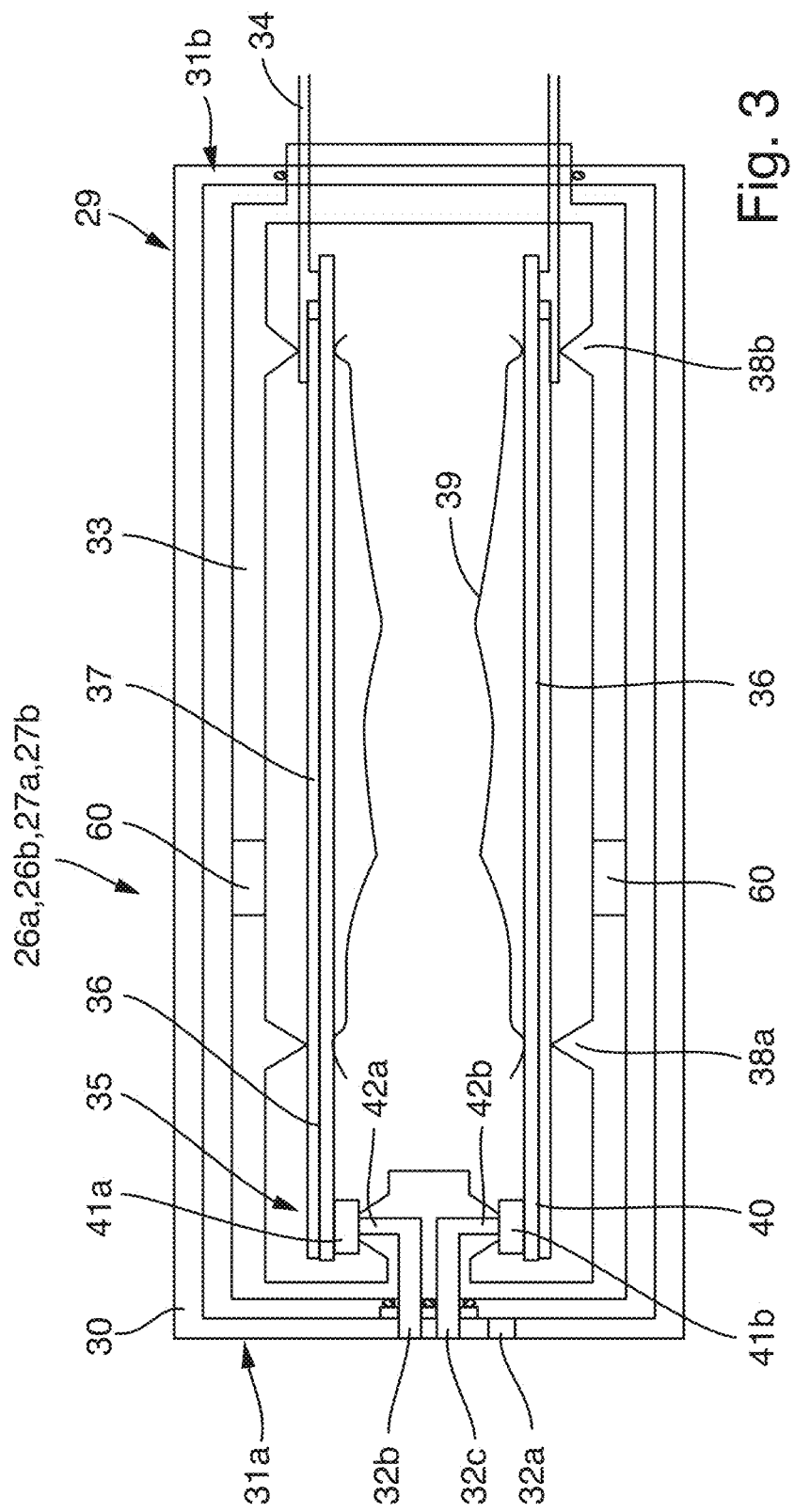
FIG. 3 shows an enlarged view of a piezoelectric valve of the fluid system shown in FIG. 1.

FIG. 3 shows a schematic illustration of a piezoelectric valve used in the piezoelectric bridge circuit. In the example shown, the piezoelectric valve is designed as a so-called piezoelectric cartridge 29, which has a cartridge housing 30 with two opposing housing end faces 31a, 31b. The first housing end face 31a is penetrated by a plurality of channels, one of which is an inflow channel 32a, via which pressurized fluid coming from the pressure source 21 can flow into the inside of the cartridge housing 30. Furthermore, the first housing end face 31a is penetrated by two working channels 32b, 32c, which are fluidically connected to the first or second working connection or alternatively a vent port. On the opposite housing end face 31b, this is penetrated by electrical contact means 34, as schematically indicated.

The piezoelectric valve further has a valve housing 33, usually in two parts, which is located within the cartridge housing 30. The valve housing delimits an elongated valve chamber 35 on the inside, which is connected to the interior of the cartridge housing via valve housing inlet openings 60. In which there is a strip-shaped bending transducer 36 with a longitudinal shape.

As shown in particular in FIG. 3, the bending transducer 36 has an elongated bearing section 37, which is mounted on two bearing portions 38a, 38b of the valve housing 35, which are only indicated schematically. On the underside of the bending transducer 36 opposite the bearing portions 38a, 38b, the bearing section 37 is acted upon by a spring element 39 in the direction of the bearing portions 38a, 38b. Starting from the front bearing point 38a, the bending transducer protrudes towards a free end in the form of a working part 40. At the free end of the working portion 40 there is a control section 41, which may be for example, a pad fixed to the bending transducer 36, made of rubber material for example. The control section 41 on the bending transducer 36 is associated with a controllable valve opening 42, which passes into one of the aforementioned working channels 32b, 32c. The working channel 32a, 32b in question is, as mentioned, associated with the first or second working chamber 16, 17.

A pad made of soft material, for example rubber material, is expediently used as the control section 41. This so-called "soft sealing seat" ensures that sealing can be easily guaranteed when the control section 41 is in contact with the valve opening 42 to be controlled without imposing great design and manufacturing requirements. Furthermore, sealing is guaranteed over the entire operating range, even in the event of temperature changes, for example, as the soft pad digs into the valve seat section on the housing side to some extent and therefore a change in temperature does not pose the risk of leakage.

The bending transducer expediently has a trimorphic design with elongated piezoelectric bodies attached to one another lengthways with an internal electrode in between. Each piezoelectric body is provided with an outer electrode on the outer side opposite the internal electrode. A control voltage can be applied to the electrodes in a selected manner via electrical contact means 34, which are guided out of the valve housing and are only indicated schematically, which causes a deflection force in the working part 40 due to the reverse piezoelectric effect.

As shown in particular in FIG. 3, the piezoelectric valve has two bending transducers 36 in the example shown, which are arranged as mirror images of each other. A second control section 41b and a second controllable valve opening 42b associated with the control section 41b are provided accordingly.

Both bending transducers of the piezoelectric valve have a 2/2 function, i.e. the corresponding control section 41a, 41b is either in fluid-tight contact with the associated controllable valve opening 42a, 42b or, when the control voltage is applied, is lifted more or less far away from the valve seat section on the housing side depending on the control voltage applied.

The two bending transducers 36 of a respective piezoelectric valve can be controlled independently of one another such that optionally only one of the two controllable valve openings 42a, 42b is opened or alternatively both valve openings 42a, b are open or closed at the same time. Opening both valve openings 42a, b results in an increased flow rate and faster pressure build-up in the associated working chamber compared to just one open valve opening, for example if the piston 14 of the double-acting working cylinder has to be moved quickly from one position to another.

One important aspect is that the bending transducers have a proportional function, i.e. depending on the control voltage applied, the associated valve opening is opened more or less wide. One important effect is that a minimum control voltage is required for such piezoelectric valves in order for the associated valve opening to be opened at all. This required minimum control voltage also defines the opening point of the piezoelectric valve.

Figure 2:
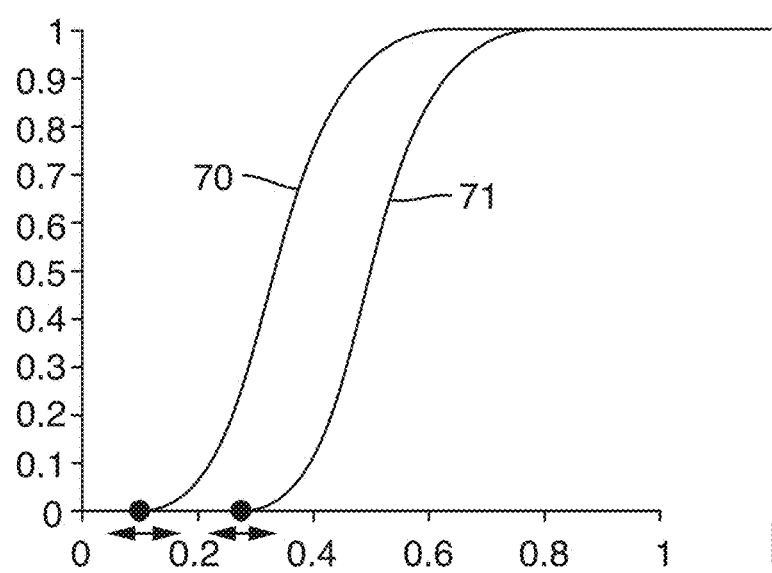
FIG. 2 shows a schematic illustration of the drift of the offset voltage in a diagram with dimensionless characteristic values.

This is illustrated in FIG. 2, where a dimensionless characteristic value of the voltage is plotted on the x axis and the dimensionless degree of opening of the valve between 0 and 1 is plotted on the y axis.

In the graph shown in FIG. 2 there are two characteristic curves, of which the left characteristic curve is the ideal characteristic curve 70 of the piezoelectric valve, i.e. in a state where the influencing factors that will be described in more detail below do not apply.

It can be seen that a certain minimum control voltage is required for the bending transducer to be lifted at all from the associated valve opening. If the control voltage applied is increased, the degree of opening of the valve opening also increases, i.e. the bending transducer with the pad is lifted further away from the associated valve opening until the valve opening 42a, 42b is completely open at a certain control voltage.

The performance of a proportional application depends to a large extent on the correct identification of the opening point. If this is unknown or if the actual opening point shifts in relation to an opening point assumed in the control unit, this can lead to stationary inaccuracies in the best case scenario and instabilities in the application in the worst case scenario. In this case, the required performance cannot be achieved or maintained.

Due to the physical properties of the piezoelectric valve, the opening point shifts so much over the course of a life cycle, even after being stored and short operating times, that this has an impact on the performance of the application and cannot therefore be neglected. The reasons for this include, inter alia, ageing, temperature changes, the differential pressure at the bender, the piezoelectric effect and the mechanical structure of the 2/2 valve.

In order to address the aforementioned issue, the fluid system according to the invention is fitted with a control device 19 with a control functionality. Furthermore, the fluid system 11 has a pressure sensor 43a, 43b coupled to the working connection 28a, 28b. In the example shown, the first working connection 28a is associated with a first pressure sensor 43a and the second working connection is associated with a second pressure sensor 43b. The pressure sensors 43a, 43b are respectively coupled to the control device. The pressure sensors 43a, 43b can be designed as differential pressure sensors.

The pressure sensors are able to measure the actual working pressure at the associated working connection 28a, 28b and transmit the values of the measured actual working pressure to the control device 19 in the form of control signals.

In the example shown, the pressure sensor 21 is also associated with a pressure sensor 44 although this pressure sensor is not strictly necessary. The pressure sensor 44 associated with the pressure sensor can be designed as an absolute pressure sensor. Furthermore, it is also possible for the pressure sink 23 to be associated with a pressure sensor 45 although this pressure sensor 45 is not strictly necessary either. The pressure sensor of the pressure sink 23 can also be designed as an absolute pressure sensor.

Figure 4:
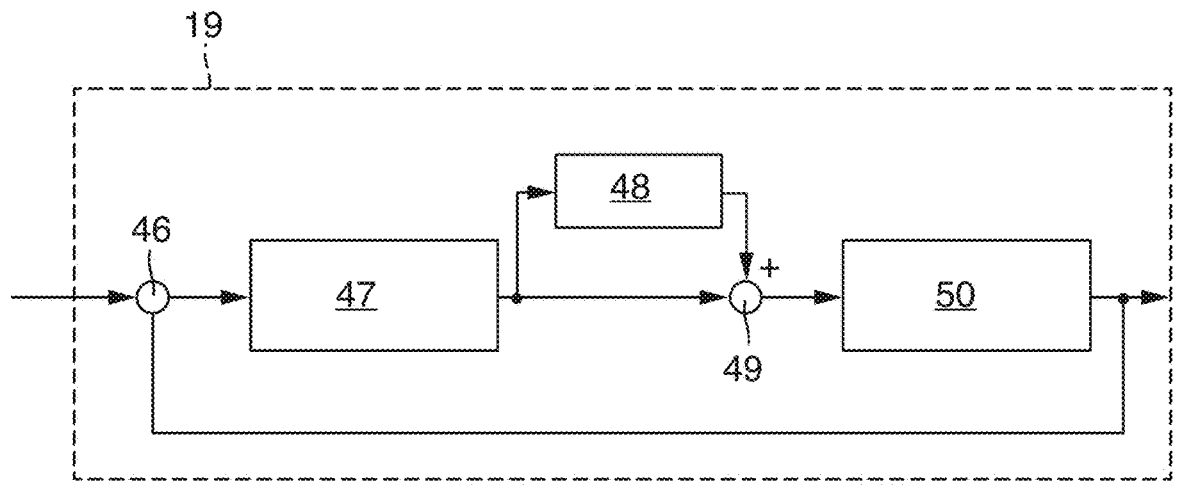
FIG. 4 shows a flowchart (block diagram) of the method according to the invention and FIG. 5 shows a flowchart according to a first approach for minimizing/eliminating the internal air consumption.

FIG. 4 shows by way of example the design of a control device 19 used in the fluid system 11 according to the invention and fitted with a control function. The control device designated throughout with reference number 19 has a comparator 46, which is able to compare the measured actual working pressure with the target working pressure. A controller 47 is connected downstream of the comparison, which executes a control function according to an algorithm if the actual working pressure deviates from the target working pressure. The controller 47 is expediently designed as a P controller or PD controller. The controller 47 is associated with at least one integrator 48, which integrates the manipulated variable and adds it to the output of the controller until the output of the controller becomes zero. A further comparator 49 is provided for this purpose. The control device 19 further comprises a section 50, which comprises signal generation and control of the corresponding bending transducers of the piezoelectric valves.

During operation of the piezoelectric valve, the offset voltage can shift and thus also the opening point of the piezoelectric valve can shift due to the aforementioned factors. Such a drift of the offset voltage is shown in FIG. 2. Compared to the ideal characteristic curve, it can be clearly seen here in the operating characteristic curve 71 shifted to the right that a greater control voltage is required to open the piezoelectric valve.

In order to solve this aforementioned problem of drift of the offset voltage and thus also drift of the opening point of the piezoelectric valves, the method according to the invention for operating the fluid system 11 is carried out in the fluid system 11 according to the invention.

First of all, the target working pressure is provided at the associated working connection 28a, 28b. It is thus, for example, possible to control and open both bending transducers of the first aeration valve 26a such that the first working chamber 16 is aerated. At the same time, it is possible to energize both bending transducers of the second vent valve 27b such that these open and the second working chamber is vented. This causes the piston to move to the right.

Next, the actual working pressure at the working connection is measured, the measurement data are transmitted to the control device 19 and the actual working pressure is compared with the target working pressure using the algorithm.

In the specific example, the actual working pressure at the first working connection 28a is thus measured by the first pressure sensor 43a and at the same time the actual working pressure at the second working connection 28b is measured by the second pressure sensor 43b. The actual working pressure at the first working connection 43a and the actual working pressure at the second connection initially change as pressure builds up at the first working chamber 16 whilst pressure is released in the second working chamber 17. In the event that the second working chamber 17 is not completely vented, the piston comes to a standstill after a certain period of time and then, after a certain subsequent pressure build-up and pressure reduction phase, constant pressures occur in the first working chamber 16 and in the second working chamber 17.

After the actual working pressure is constant over a certain time period, the at least one integrator 48 is activated if the actual working pressure deviates from the target working pressure, whereby the control deviation of the control voltage is integrated and added to the output of the controller until the output of the controller becomes zero.

If the output of the controller 47 is zero, the entire offset voltage is represented by the integrators. As it is assumed that the change in the offset voltage is slow compared to the change in state, the integrators 48 can be operated slowly.

The property of the section 50 described above (measured value=target value due to the integrating behaviour) is, however, only applicable to stationary conditions, as described. Both the target working pressure and the actual working pressure must therefore be constant. Consequently, the integrators 48 may only be active if there are stationary target and measured variables. In dynamic cases with changing target or measured values, the integrators 48 are not active.

In addition, other measures are required to guarantee the correct adaptation of the offset voltage.

For this purpose, it is provided that every aeration and every vent valve 26a, 26b; 27a, 27b is respectively associated with its own integrator 48.

Furthermore, it must be ensured that integration does not lead to any internal air consumption, i.e. overflow from the aeration valve to the vent valve should be prevented.

Such a situation may arise, for example, when both working chambers 16, 17 are respectively to be kept under a certain constant pressure. Although it would then be possible to close the two aeration valves, it may well be the case that disturbance variables (for example damaged seals) result in pressure fluctuations that must then be compensated for, wherein both the aeration valve and the vent valve 27a, b are then active.

Figure 5:
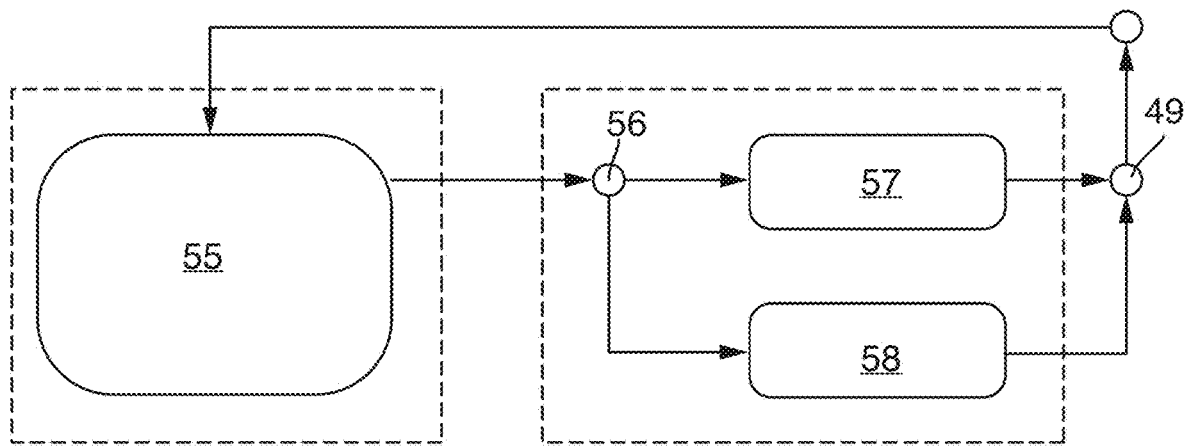

FIG. 5 shows a flowchart setting out a first approach for resolving the aforementioned issue. According to a first approach, both integrators, i.e. the integrators of the aeration valve and of the vent while are driven slowly towards a lower limit value during operation, wherein the speed is considerably lower than the integration of the offset-voltage.

The integrators are therefore driven virtually "empty", but slower than the compensation of the offset voltage such that the internal air consumption is slowly reduced. According to the flowchart of the first approach, the integrators 48 are slowly driven towards a lower limit value during operation according to the method step "slow reduction 55". If 5 there is a stationary target and actual value 56, the offset voltage is adapted as described above, wherein either a control error-dependent increase 57 in the control voltage of the aeration valve 26a, 26b takes place or a control error-dependent increase 58 in the control voltage of the vent valve 27a, 27b takes place.

In a second approach (not shown) for reducing the internal air consumption, the offset voltage of a bending transducer of a piezoelectric valve, i.e. for example of one of the aeration valves 26a, 26b, is integrated, whilst the corresponding other piezoelectric valve, i.e. for example the vent valve 27a, 27b, is set to a defined state, for example the associated bending transducer is in the closed position. This allows the effect of aeration on the one hand and venting on the other to be separated.

The invention claimed is:

1. A method for operating a fluid system, which has a control device with a control functionality and a piezoelectric valve assembly that can be controlled by the control device, wherein the piezoelectric valve assembly has an aeration port connected to a pressure source and a vent port connected to a pressure sink, wherein the piezoelectric valve assembly has at least one aeration valve formed as a piezoelectric valve and connected to the aeration port and at least one vent valve formed as a piezoelectric valve and connected to the vent port, wherein the at least one aeration valve and the at least one vent valve are respectively connected to at least one working connection connected to a working chamber of a fluid consumer, and wherein the at least one aeration valve and the at least one vent valve respectively have at least one piezoelectric bending transducer, which in a closed position bears against a valve seat of the associated valve and closes a valve opening in a fluid-tight manner and which can be moved into open positions lifted to different extents from the valve seat as a function of an applied control voltage, wherein the aeration port and the at least one working connection are respectively connected to a pressure sensor coupled to the control device, and wherein the control device has an algorithm with at least one implemented integrator, the method having the following steps:

providing a target working pressure at the at least one working connection, measurement of an actual working pressure at the at least one working connection by the pressure sensor, transmitting measurement data to the control device and applying the algorithm to compare the actual working pressure with the target working pressure, activating the at least one implemented integrator to integrate a control deviation of the applied control voltage after the actual working pressure is constant over a certain time period, changing the applied control voltage as a function of a determined target/actual deviation taking into account operation of the at least one implemented integrator.

2. The method according to claim 1, wherein at least two integrators that can be activated independently of on another are implemented in the algorithm, of which at least one is active during aeration through the at least one aeration valve and at least another is active during venting through the at least one vent valve.

3. The method according to claim 1, wherein the at least one implemented integrator of the algorithm is deactivated when the target working pressure is changed or the measured actual working pressure changes over a certain time period.

4. The method according to claim 1, wherein the at least one implemented integrator of the at least one aeration valve and the at least one implemented integrator of the at least one vent valve are driven slowly towards a lower limit value during operation, wherein a speed is lower than the integration of the control deviation of the applied control voltage.

5. The method according to claim 1, wherein the at least one implemented integrator of the at least one aeration valve or the at least one implemented integrator of the at least one vent valve is activated and offset voltage of the at least one piezoelectric bending transducer of the at least one aeration valve or offset voltage of the at least one piezoelectric bending transducer of the at least one vent valve is determined whilst the respective other piezoelectric bending transducer is set to a defined state.

6. The method according to claim 1, wherein the fluid consumer has two working chambers that can be aerated or vented separately, in particular independently of one another, of which a first working chamber is associated with a first aeration valve and a first vent valve with a first working connection and first pressure sensor and a second working chamber is associated with a second aeration valve and a second vent valve with a second working connection and second pressure sensor.

7. The method according to claim 1, wherein the fluid consumer is a single or double-acting working cylinder, fluidic, in particular pneumatic gripper or a pressure-controlled volumetric unit.

8. A non-transitory computer medium including a computer program product for use in a computer device comprising instructions, which carry out the method according to claim 1, when executed by a processor in a control device of a fluid system.

9. A fluid system for operating a fluid consumer, having a control device with a control functionality and a piezoelectric valve assembly that can be controlled by the control device, wherein the piezoelectric valve assembly has an aeration port connected to a pressure source and a vent port connected to a pressure sink, wherein the piezoelectric valve assembly has at least one aeration valve formed as a piezoelectric valve and connected to the aeration port and at least one vent valve formed as a piezoelectric valve and connected to the vent port, wherein the at least one aeration and the at least one vent valve are respectively connected to at least one working connection connected to a working chamber of the fluid consumer, and wherein the at least one aeration and the at least one vent valve respectively have at least one piezoelectric bending transducer, which in a closed position bears against a valve seat of the associated valve and closes a valve opening in a fluid-tight manner and which can be moved into open positions lifted to different extents from the valve seat as a function of an applied control voltage, wherein the aeration port and the at least one working connection are respectively connected to a pressure sensor coupled to the control device, and wherein the control device has an algorithm with at least one implemented integrator, and wherein the control device is designed to carry out a comparison of an actual working pressure with an target working pressure from a provided target working pressure at the at least one working connection and from a measurement of the actual working pressure at the at least one working connection by the pressure sensor, wherein the at least one implemented integrator can be activated to integrate a control deviation of the applied control voltage after the actual working pressure is constant over a certain time period and wherein the applied control voltage can be changed as a function of a determined target/actual deviation taking into account operation of the at least one implemented integrator.

10. The fluid system according to claim 9, wherein the control device is designed to carry out a method having the following steps: providing a target working pressure at the at least one working connection, measurement of the actual working pressure at the at least one working connection by the pressure sensor, transmitting measurement data to the control device and applying the algorithm to compare the actual working pressure with the target working pressure, activating the at least one implemented integrator to integrate the control deviation of the applied control voltage after the actual working pressure is constant over a certain time period, and changing the applied control voltage as a function of the determined target/actual deviation taking into account the operation of the at least one implemented integrator.

11. The fluid system according to claim 9 wherein the piezoelectric valves respectively have two bending transducers that can be controlled independently of one another.

12. The fluid system according to claim 9, wherein the pressure sensor associated with the aeration port is designed to determine an aeration or supply pressure as an absolute pressure sensor.

13. The fluid system according to claim 9, wherein a pressure sensor for determining a vent or exhaust air pressure is associated with the vent port.

* * * * *